May 6, 1930.   L. EDENBURG   1,757,659
ELECTRICAL INDICATING INSTRUMENT
Filed March 11, 1926   2 Sheets-Sheet 2
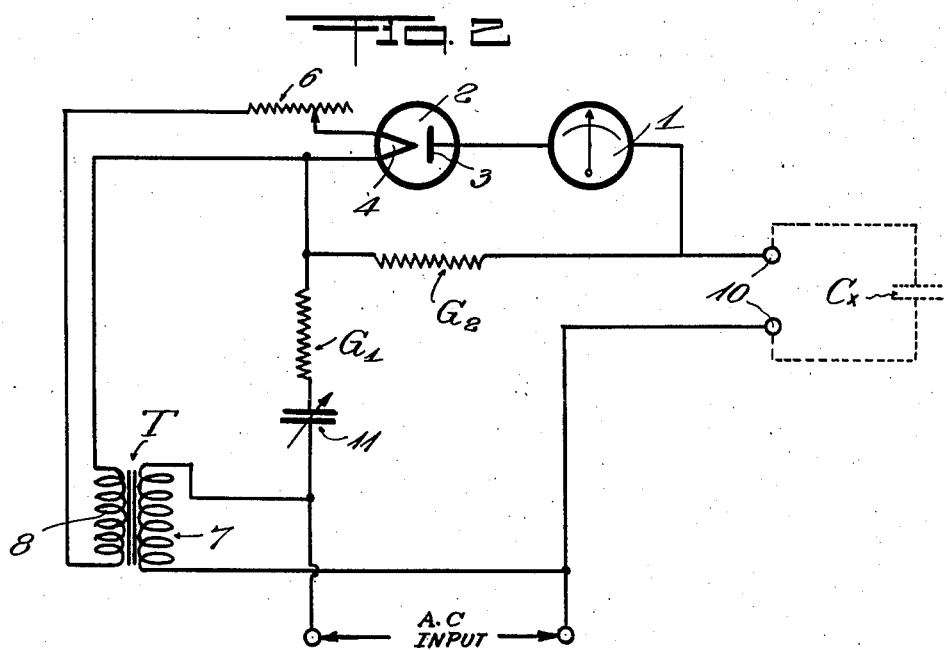
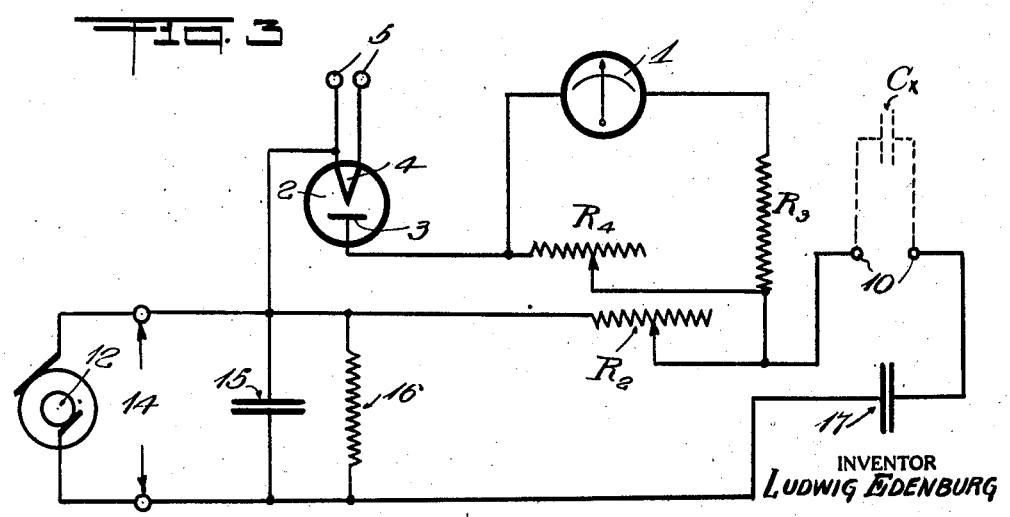
INVENTOR
LUDWIG EDENBURG
BY
William F. Nickel
ATTORNEY Patented May 6, 1930

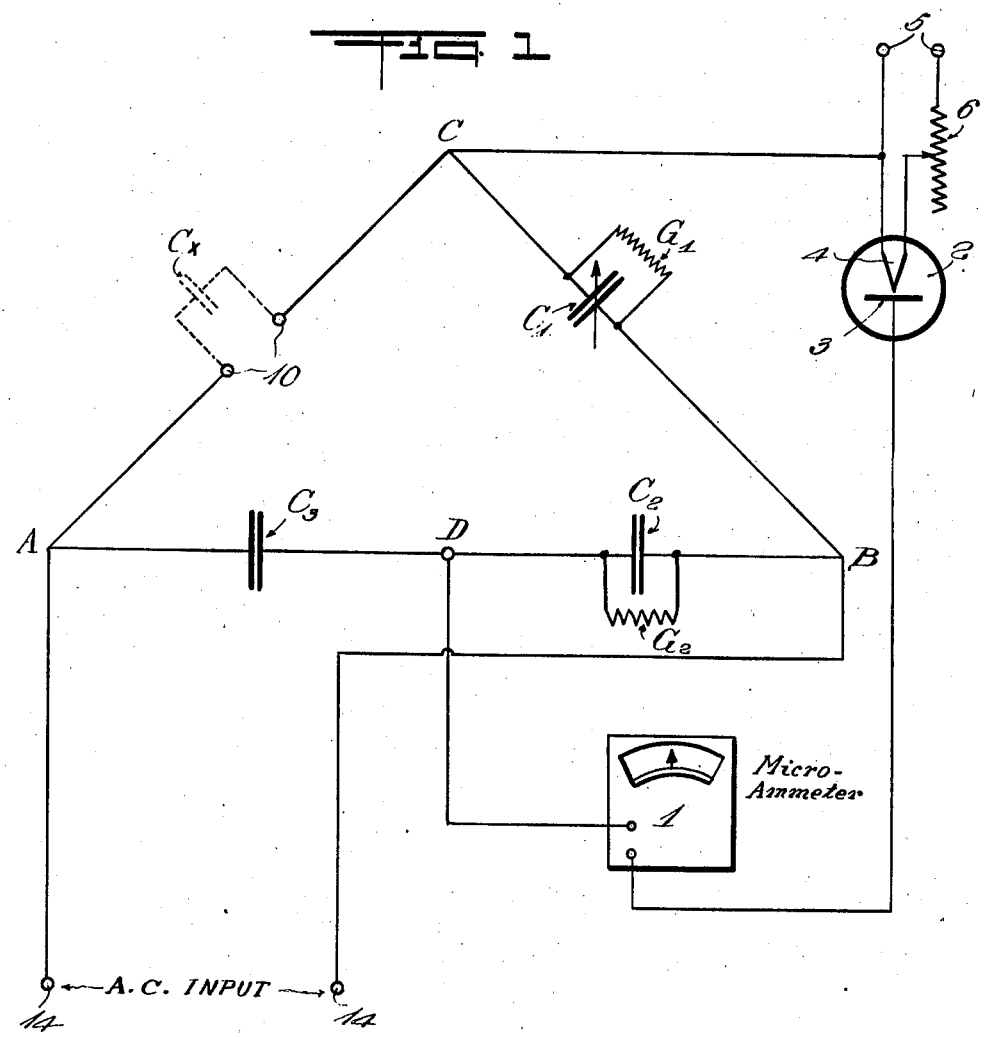

1,757,659

UNITED STATES PATENT OFFICE

LUDWIG EDENBURG, OF MOUNT VERNON, NEW YORK, ASSIGNOR TO DUBILIER CONDENSER CORPORATION, OF NEW YORK, N. Y., A CORPORATION OF DELAWARE

ELECTRICAL INDICATING INSTRUMENT

Application filed March 11, 1926. Serial No. 93,948.

My invention relates broadly to electrical measuring apparatus and more particularly to a direct reading capacity meter.

One of the objects of my invention is to provide a circuit arrangement for a microfarad meter whereby the capacity of condensers may be rapidly determined.

Another object of my invention is to provide a direct reading meter for testing electrical condensers during their passage through a manufacturing production program for rapidly selecting condensers of proper capacity and rejecting those condensers which do not fulfill the requirements.

Still another object of my invention is to provide a circuit for a visual capacity bridge direct reading meter for determining the capacity of electrical condensers permitting the selection of condensers of desired capacity and the rejection of condensers which fall outside of the desired limits.

My invention will be more fully understood from the following specification by reference to the accompanying drawings, wherein:

Figure 1 shows diagrammatically the principle of my invention; Fig. 2 shows one of the practical embodiments of my invention in a direct reading meter circuit; and Fig. 3 shows a circuit arrangement for a microfarad meter constructed in accordance with my invention.

My invention contemplates the rapid determination of the electrical capacity of condensers by merely connecting the condenser to be tested across two terminals of an electrical testing apparatus and observing the deflection of a meter which is calibrated in terms of microfarads. I provide a balanced bridge circuit where the condenser to be tested is insertable in one arm of the bridge. An alternating current power supply is connected across the bridge circuit and the value of current flow through the condenser on test measured as a direct function of the capacity of the electrical condenser. The slight current which passes through the condenser on test varies in accordance with the capacity of the condenser. I provide a rectifying system in circuit with the condenser on test whereby the rectified current passes through a series circuit which includes both an observing meter and the condenser on test. The meter, which may be a direct current milli or micro ammeter, is calibrated in microfarads and will indicate the various currents according to the formula:

$$I = \frac{2\pi f C_x E}{10^6}$$

Referring to the drawings in more detail, the direct reading meter is represented at 1 in series with the rectifier tube 2 including anode 3 and cathode 4. Power for heating the cathode 4 is obtained from terminals 5 under control of rheostat 6.

In Fig. 2 I have shown a transformer system T having primary winding 7 and secondary winding 8 for supplying filament heating power. In Fig. 1 the parts of the test circuit are arranged in the form of a bridge which I have designated as having arms AD, DB, BC, and CA. Across the points AB I supply from terminals 14 an alternating current of audio frequency, that is, for example, 500 cycles. Across the points CD of the bridge circuit I connect the rectifier tube 2 and the microammeter 1. Each arm of the bridge circuit is balanced, that is to say, arm AD is balanced by means of condenser $C_3$. Arm DB is balanced by means of condenser $C_2$ shunted by means of resistance element $G_2$. Arm BC includes variable capacity element $C_1$ shunted by resistance $G_1$. The condenser $C_x$ whose capacity is to be determined is connected across terminals 10 of arm AC. The capacity of $C_x$ will determine the amount of current in the plate circuit of the rectifier 2 and so the capacity value of $C_x$ may be read directly from the calibrated scale of meter 1 which reads in terms of microfarads. A distinct advantage is secured by reason of the rapid direct reading of capacity which is possible by the circuit arrangement of my invention.

In Fig. 2 I have shown the unknown capacity $C_x$ connected across test terminals 10 in series with the rectifier 2 and observing meter 1. The meter and rectifier circuit is shunted by resistance $G_2$ and connected in series with resistance $G_1$ and variable capacity 11. The capacity values of condensers $C_x$ in this instance may also be read directly upon calibrated meter 1.

In the arrangement illustrated in Fig. 3 the alternating current supply is designated by generator 12 which is shunted by high resistance 16 and condenser 15 so that its regulation is stabilized. A variable high resistance balance $R_2$ is inserted in series with the power supply circuit and in series with the test terminals 10, across which the condenser $C_x$ whose capacity is to be determined, is arranged to be connected. I provide an auxiliary condenser 17 in series with the supply circuit serving as a protector in case of short circuit of the test condenser $C_x$. I provide adjustable resistances $R_3$ and $R_4$ around meter 1 for securing proper shunt adjustments. The rectifier 2 is disposed in series with the meter 1 for subjecting the meter to currents which are proportional in value to the current passing through the condenser on test.

It will be observed that the system of my invention permits the rapid testing of electrical condensers and the acceptance or rejection of condensers of proper sizes during their passage through a production program.

While I have described the circuit arrangement of my invention in certain particular embodiments, I desire that it be understood that modifications may be made and that no limitations upon the invention are intended other than are imposed by the scope of the appended claims.

What I claim as new and desire to secure by Letters Patent of the United States is as follows:

1. In an apparatus for visually determining the electrical capacity of condensers the combination of a circuit, a source of alternating current connected in said circuit, a visual measuring instrument and a rectifying device connected in series, a resistance shunted past said series in said circuit, a resistance shunted past said measuring instrument, and terminals for the connection of the capacity to be measured in the circuit whereby readings on said visual measuring instrument may be taken directly in proportion to the capacity value of said condenser on test for determining the electrical capacity thereof.

2. An apparatus for measuring the capacity of electrical condensers comprising a source of alternating current, a series connected circuit including a direct reading meter and a rectifying device, terminals for connecting an electrical condenser, whose capacity is to be determined, in said series circuit whereby the current values through condensers of different electrical capacities may be directly read by said meter for observing the electrical capacity of condensers on test.

3. An apparatus for measuring the capacity of electrical condensers comprising in combination a source of alternating current, a series circuit including means for rectifying said current, a meter actuated by the rectified current, and detachable means by which a condenser whose capacity is to be measured may be connected in said series circuit or removed from said series circuit for obtaining readings on said meter in accordance with the electrical capacity of the condenser whereby the capacity of the condenser may be directly determined.

4. In an apparatus for determining the capacity of electrical condensers the combination of a circuit having terminals for connection of condensers of unknown capacity therein, a rectifying device and a direct reading meter connected in series and in said circuit, a source of alternating current connected in said circuit whereby the current through said condenser on test may be directly measured by said meter for determining the capacity of the condenser on test.

5. An apparatus for measuring the capacity of electrical condensers comprising in combination a source of alternating current, a series circuit including a meter calibrated in terms of capacity, a rectifying device in series with said meter, and means for completing connection between said source and said series circuit through a condenser whose capacity is to be determined whereby variable values of current through said condenser enables differing deflections to be obtained on said meter for directly determining the capacity of the electrical condenser on test.

In testimony whereof I affix my signature.

LUDWIG EDENBURG.